United States Patent [19]
Fraser

[11] 3,771,659
[45] Nov. 13, 1973

[54] BOTTOM CONNECTOR AND FILTER HOLDER FOR CHROMOTOGRAPHIC COLUMN

[75] Inventor: Douglas S. Fraser, New Paltz, N.Y.

[73] Assignee: Cenco Medical Health Supply Corporation, Chicago, Ill.

[22] Filed: June 7, 1971

[21] Appl. No.: 150,588

[52] U.S. Cl. .............................. 210/198 C, 55/386
[51] Int. Cl. ............................................ B01d 15/08
[58] Field of Search ...................... 210/31 C, 198 C; 55/386

[56] References Cited
UNITED STATES PATENTS 3,578,785  5/1971  Patterson ........................ 210/198 C
3,511,377  5/1970  Hrdina ............................. 210/198 C

*Primary Examiner*—John Adee
*Attorney*—Robert E. Wagner and Robert E. Browne

[57] ABSTRACT

An improved bottom connector and filter holder apparatus for channeling the fluid contained in a chromotographic column in a uniform manner toward the bottom of such column. An apparatus insertable into the lower end of a conventional round bore chromotographic column, including an upper hollow portion having interior walls converging toward a filter means maintained in position and supported by a lower flanged portion of said apparatus.

4 Claims, 3 Drawing Figures

PATENTED NOV 13 1973  3,771,659

INVENTOR
DOUGLAS S. FRASER
BY Robert E. Wagner
ATT'Y.

BOTTOM CONNECTOR AND FILTER HOLDER FOR CHROMOTOGRAPHIC COLUMN

BACKGROUND OF THE INVENTION

This invention relates to chromotographic columns and, more particularly, to an improved apparatus for use in providing uniform flow of fluid through a filter means located at the bottom of a conventional round bore chromotographic column.

Chromotogaphic columns have been in use for many years as tools in the analysis of fluids, particularly liquids such as amino acids, peptides, proteins and nucleic acids. The chromotographic column apparatus used in such analyses have included both plunger type and pressure type columns.

In the normal operational procedure such as, for example, analysis of amino acids by separation, the sample containing the organic compound, in this case the amino acids, is placed on a column of ion exchange resins within the walls of the round bore chromotographic column. The sample containing the amino acids is then forced to filter down the column through the resin toward a porous Teflon filter or membrane in the bottom of the column. As the sample moves through the column, ion exchange takes place and a given quantity of individual amino acids are separated out of the sample in different zones, depending on the characteristics of the structure of each individual acid. Provided the capacity of the resin is not exceeded, each amino acid in the sample moves down the column in an individual and independent zone. With appropriate control of the several variables inherent in the separation process and the individual amino acids, conditions are established which allow the amino acids to be separated from each other by the time they emerge from the column. Upon emergence, the separated acids may be individually analyzed.

It is of utmost importance then, for purposes of good separation and complete results that the flow of the sample through the column be uniform, and that the entire sample be forced out of the column through the filter in the bottom in such a uniform manner.

In the past, the major disadvantage of both plunger and pressure type chromatographic columns has been that the configuration of the column bottom has not been appropriate to insure uniform fluid flow through the filter. Since chromatographic columns are most often fabricated of materials such as glass, the easiest and most economical shape in which to form such columns is a cylinder or a round bore of constant diameter throughout, including the bottom portion. The problem with forming these columns in such a constant diameter configuration is that the capillary outlet which receives the flow from the filter is of much smaller diameter than these chromotographic columns formed in a cylindrical configuration and is also smaller in diameter than the porous filter or membrane. The result of this difference in diameter is that the flow of the sample and separate organic compounds out of the column becomes more impeded or intermittent, because of the drastic change in cross-sectional flow area as the lateral distance from the mouth of the capillary outlet tube increases. As the flow becomes more impeded, a residue of the sample or separated organic compound begins to build up in the filter and on the surface thereof and collects near the walls of the chromatographic column. Thus flow becomes non-uniform and slows throughout the entire column and the collection of residue restricts accurate and precise analysis of the organic compounds contained in the samples since separation may be destroyed or not even completed.

An attempt at solving the problems posed by the use of conventional column filter and outlet tube means has been made by forming the chromotographic column itself in such a manner that the walls of the column are tapered, slanted or beveled inward toward the filter means near the bottom end of the column. The major disadvantage of this method of overcoming the flow problem is that since the columns are precision bored and tooled and usually made of brittle material such as glass, special shaping of the bottom portion in this manner is extremely expensive and time consuming, requires special connectors and entails more particular care in cleaning.

DESCRIPTION OF THE INVENTION

This invention comprises an improved bottom connector and filter holder apparatus providing for complete and uniform flow of fluid through a chromotographic column through a filter means and into an outlet capillary tube. The apparatus of this invention achieves this complete and uniform flow by channeling or funneling the fluid flowing downward in a conventional round bore chromotographic column to a filter means by means of converging walls leading to the filter means. The improved bottom connector and filter holder means is formed of a unitary piece of material, the upper hollow portion of which has exterior walls of cylindrical configuration and which is insertable into the lower end of a conventional round bore chromotographic column. The interior walls of this upper hollow portion converge toward a filter means held by a lower portion of the filter holder means. The lower portion of this apparatus includes an opening formed at the narrow end or mouth of the interior walls which supports and maintains in position a porous filter means or membrane which is usually constructed of Teflon material. The fluid passes through the filter means into a capillary outlet tube having a diameter similar to that of the filter means. The lower portion of the apparatus has an annular flange extending beyond the interior diameter of the chromotographic column in such a manner that the lower end of such column abuts and bears on the radially facing surface of the flange. The entire lower portion of the apparatus as well as the junction of the flange and the lower end of the column are normally enclosed in a column water jacket and supported by a bottom connector collar or fitting.

As the sample fluid or liquid is forced down through the chromotographic column and the organic compounds are separated out into various zones, the compounds and remaining sample, upon reaching the bottom end of the column, are forced toward the filter means at the bottom of the column by means of the converging interior walls of the upper portion of this apparatus. Since the fluid is forced directly into the filter means and capillary outlet tube through a sequence of decreasingly smaller cross-sectional areas, the velocity of the fluid through the filter and outlet tube is increased gradually so that uniformity of flow is not lost. In addition, there are no corners present in the interior of the upper portion where the remainder of the sample or any of the separated organic compounds may collect and thus partially destroy the separation or accuracy of the analysis.

Accordingly, it is an object of this invention to provide a bottom connector and filter holder apparatus for chromotographic columns which will assure uniform and complete flow of the fluid through and out of a chromotographic column.

It is a further object of this invention to provide an apparatus of the character described which is insertable into a conventional column of cylindrical or round bore configuration.

It is another object of this invention to provide an apparatus which will allow for easy removability of the filter means for cleaning or replacement.

It is still another object of this invention to provide an improved bottom connector and a filter holder apparatus which is formed from a unitary piece of material in such a manner that it will assure complete separation and uniform and complete flow of the fluid contained in a chromotographic column through and out of such column and into an outlet capillary tube.

These and other important objects of the present invention will become apparent from the following description taken in conjunction with the drawings illustrating a preferred embodiment where:

Figure 1:
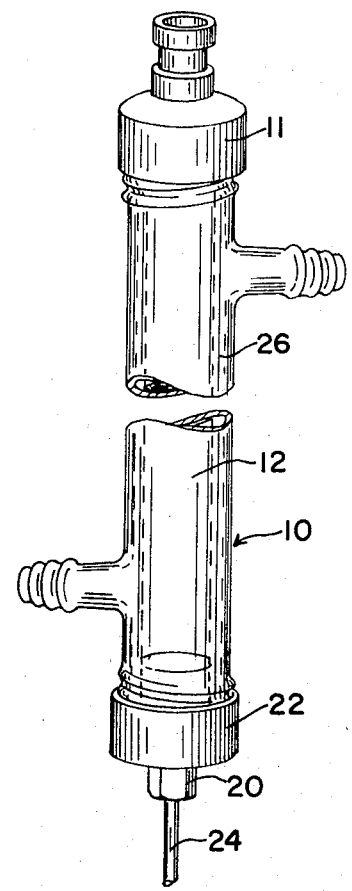
FIG. 1 is a front elevational view of a standard commercial type of chromotographic column, surrounded by a water jacket.

Referring now to the drawings and more particularly to FIG. 1, a conventional chromotographic column assembly with bottom and top fittings is shown at 10. Such chromotographic column 10 has a uniform round bore or cylindrical column portion 12 surrounded by a standard water jacket 26 having a top connector collar 11, a bottom connector collar 22, a bottom tube connector bolt 20 and an outlet capillary tube 24. The top connector collar 11 and the bottom connector collar 22 are attached to the water jacket 26 by means of corresponding screw threads formed in the jacket 26 and the collars 11 and 22.

Figure 2:
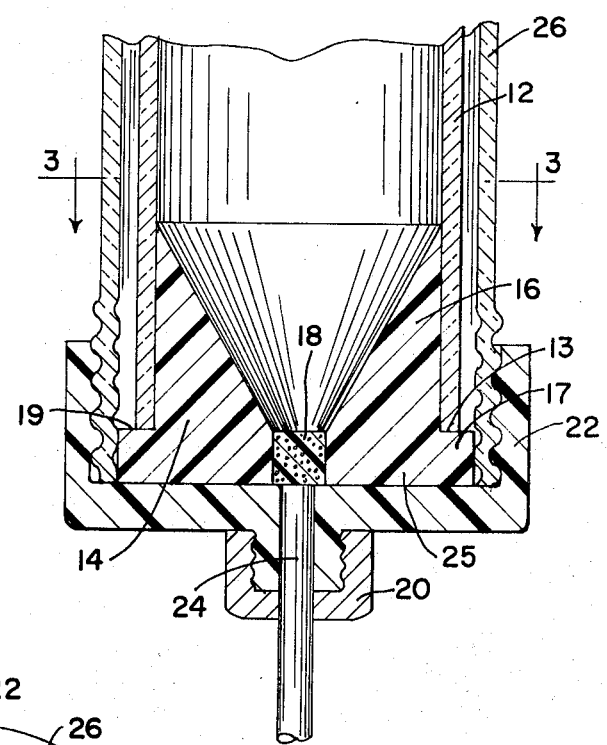
FIG. 2 is an enlarged vertical cross-sectional view of the lower portion of the conventional chromotographic column of FIG. 1 having the improved bottom connector and filter holder inserted at the lower end.

As shown in FIG. 2, the bottom connector collar 22, when screwed into position over the end of the jacket 26, supports and maintains in position the improved bottom connector and filter holder apparatus 14, the filter membrane or porous disc 18, the outlet capillary tube 24 and the round bore column 12.

The improved bottom connector and filter holder apparatus 14 has an upper portion 16 which includes interior walls converging downward toward the filter membrane 18, and exterior walls having a configuration substantially similar to that of the interior walls of the round bore column 12. The filter holder 14 also has a lower portion 25 having a cylindrical opening disposed at its center which holds the filter membrane 18 at the narrow end or mouth of the upper portion 16. The lower portion 25 has an annular flange 17 extending slightly beyond the interior dimension of the round bore column 12. The upper or radially facing surface 19 of the flange 17 abuts and supports in bearing the lower end 13 of the round bore column 12 about its entire circumference.

Figure 3:
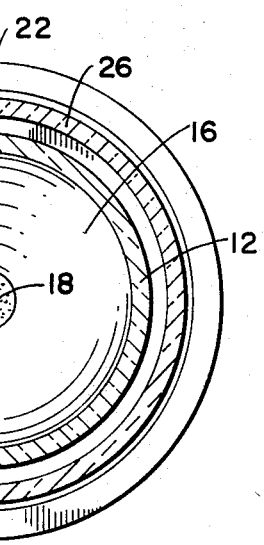
FIG. 3 is a horizontal cross-sectional view of the lower portion of the conventional chromotographic column of FIG. 1 and taken along line 3—3 in FIG. 2.

FIG. 3 illustrates the manner in which the upper portion 16 of the bottom connector and filter holder 14 is inserted into the round bore column 12. FIG. 3 also shows how the interior walls of the upper portion 16 of the filter holder 14 converge downward toward the filter membrane or porous disc 18 disposed at their narrow end or mouth. Such converging walls act to effectively channel the flow of fluid moving downward in the chromotographic column toward one central point where the filter membrane 18 is disposed. As the fluid is filtered through the filter membrane 18, it passes into the outlet capillary tube 24 and is transferred thereby out of the chromotographic column for further analysis. While the bottom connector and filter holder 14 is held in place against the lower end 13 of the round bore column 12 by the bottom connector collar 22, which is screwed onto the water jacket 26 over the screw threads molded therein, the outlet capillary tube 24 is maintained in position as shown in FIG. 2 beneath the filter membrane 18 and through the bottom connector collar 22 by a bottom connector bolt 20 which is similarly screwed onto a threaded portion of the bottom connector collar 22.

Such a screw on type of assembly permits the bottom connector and filter holder 14 to be removed easily from the round bore column 12 so that both the column 12 and the filter holder 14 may be cleaned, if necessary, and so that the filter membrane 18 may be cleaned or replaced.

The bottom connector and filter holder 14 is preferably formed of a unitary piece of material in a configuration such as that shown in FIG. 2 which may easily be inserted into the lower end 13 of any commercial round bore column 12 and maintained in a fixed position therein. The bottom connector and filter holder 14 may be constructed of any suitable material which is impervious to fluid and highly resistant to corrosion such as a chemically inert compound like Kel-F. The filter membrane 18 may be constructed of any suitable material which is naturally porous or may be made artificially porous and which is likewise highly resistant to corrosion, such as Teflon.

The bottom connector collar 22 may be made of any suitable material which is corrosion resistant and impervious to fluid, such as Kel-F. The bottom connector bolt 20 may be made of any suitable material for making conventional bolts such as stainless steel or stainless steel alloys. The outlet capillary tube 24 may be constructed of any suitable material which is flexible, corrosion resistant, and capable of withstanding high pressures.

The water jacket 26, whose primary function is to provide for a circulatory water bath around the column 12 to maintain a constant operating temperature, may be, like the column 12, formed from any rigid, impervious, corrosion resistant, easily formed material such as glass.

While the invention has been described in relation to a preferred embodiment thereof, it will be apparent to those skilled in the art that the structural details are capable of wide variation without departing from the principles of the invention.

I claim:

1. In a column for use in fluid chromatography, including a generally cylindrical hollow column open at its opposite ends and having a substantially uniform interior diameter throughout its length, column separation means disposed within the column to separate fluids forced downwardly through the column and the separation means into individual compositions for further analysis, a generally cylindrical water jacket surrounding said hollow column along its length to provide for maintenance of a constant operating temperature within said column and top connector means mounted over the top opening of said column and allowing the introduction of fluids to be analyzed into said column, the improvement comprising integrally formed filter holder means having an upper portion and a flanged lower portion, said upper portion of said filter holder means having generally cylindrical exterior walls with an outside diameter only slightly less that the interior diameter of said column such that said upper portion of said filter holder means may be inserted into the bottom opening of said column, said upper portion having a hollow interior of generally frusto-conical configuration formed by interior walls converging inwardly toward a central axis of said filter holder means, the diameter of the interior walls of said upper hollow portion of said filter holder means being substantially equal to the diameter of the exterior walls of said filter holder means at the top edge of said upper portion of said filter holder means to eliminate shoulders or edges between the interior walls of said column and the interior of said upper portion upon which the fluid being filtered could collect, said lower portion of said filter holder means having an annular flange extending radially beyond the exterior wall of said column to thereby fluid-tightly support the lower end of said column on an upper facing surface of said flange, said lower portion having an opening formed in it about the central axis of the filter holder means corresponding in diameter to the least diameter formed by the converging interior walls of the frusto-conical upper portion, filter means disposed in siad opening formed in the lower portion of said filter holder means, and bottom-fitting means removably mounted on said water jacket to support said filter holder means and said filter means in position and carrying outlet capillary tube means disposed near its center for alignment beneath said filter means to receive separated fluid from said column through said filter means.

2. The improvement set forth in claim 1 wherein said filter means is formed of tetrafluoroethylene.

3. The improvement set forth in claim 1 wherein the plane of the surface of the interior walls of said upper portion of said filter holder means intersects the plane of the surface of the interior walls of said column at an obtuse angle to facilitate flow between the walls of said column and the interior walls of said filter holder means.

4. In a chromotographic column particularly adapted for use in separating a fluid into different zones of composition and including a cylindrical column open at its opposite ends and having a generally uniform diameter along its length and a generally cylindrical water jacket surrounding said column to assist in maintaining a constant operating temperature in said column, the improvement comprising filter holder means having an upper portion insertable into a lower end of said column, the interior of said upper portion being of hollow, frusto-conical configuration to allow unimpeded flow of said fluid from said column into said filter holder means, and having a lower portion, said lower portion having an annular flange extending radially beyond the walls of said column, and supporting the bottom edge of said column on an upper face thereof, filter means disposed in an opening formed near the center of said lower portion of said filter holder means to receive fluid from said column which has passed through said upper portion of said filter holder means, and a bottom-fitting means having a capillary tube mounted therein to receive separated fluid from said filter means, said bottom fitting threadedly engaging said water jacket such that said bottom fitting may be brought adjacent said filter holder means to jam said annular flange of said filter holder means into fluid-tight relationship with the bottom edge of said column.

* * * * *